UNITED STATES PATENT OFFICE.

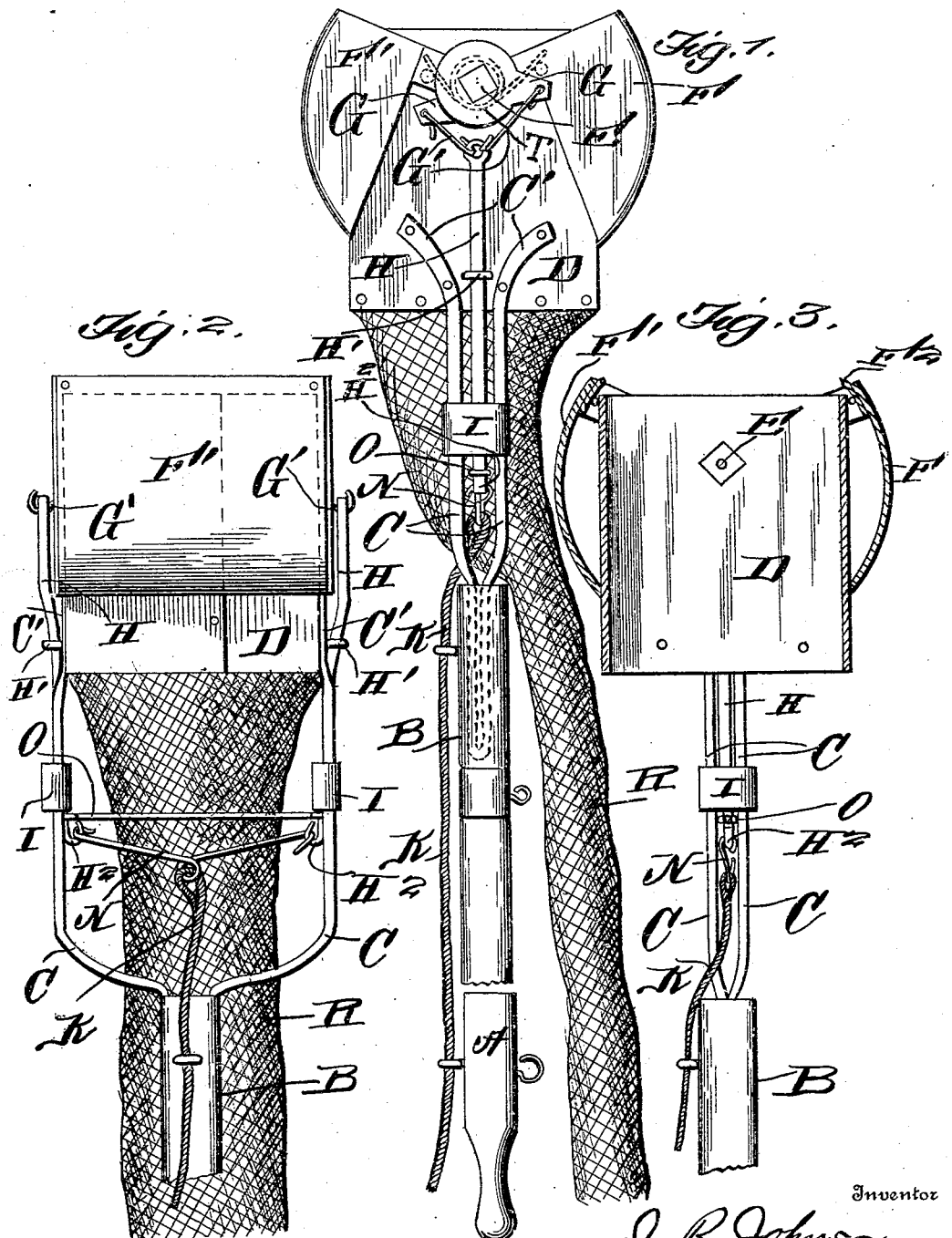

JOHN ROBERT JOHNSON, OF LOUISVILLE, KENTUCKY.

FRUIT-PICKER.

941,258.　　　　Specification of Letters Patent.　　Patented Nov. 23, 1909.

Application filed May 13, 1909.　Serial No. 495,786.

*To all whom it may concern:*

Be it known that I, JOHN R. JOHNSON, a citizen of the United States, residing at Louisville, in the county of Jefferson and State of Kentucky, have invented certain new and useful Improvements in Fruit-Pickers; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in fruit pickers and consists of a simple and efficient device of this nature, comprising various details of construction and combinations and arrangements of parts which will be hereinafter fully described and then specifically defined in the appended claims.

My invention is illustrated in the accompanying drawings, in which:—

Figure 1 is a side elevation of my invention showing the jaws of the fruit picker open. Fig. 2 is a view in elevation taken in a plane at right angles to the plane of Fig. 1, and Fig. 3 is a vertical sectional view through Fig. 1.

Reference now being had to the details of drawings by letter, A designates a handle made up preferably of sections in order that the fruit picker may be utilized for reaching at different heights and fastened to one of the sections of the handle is a ferrule B to which are fastened the two wires C, each of which is bent upon itself and held to the handle by the ferrule B and its ends outwardly flared, as at C', shown in Fig. 1 of the drawings, and fastened to the opposite faces of the square shell D open at its upper and lower ends.

Pivotally mounted upon the pins E which project from the opposite sides of the shell are the two jaws F and F', one of which F is sharp as at F², shown in Fig. 3 of the drawings, and adapted to coöperate with the other jaw to sever the fruit. Each of said jaws has an integral arm G to which wires G' are fastened which in turn are fastened to a rod H, one upon either side of the shell, and which rods H are guided through the eyes H' upon the shell and also by the straps I which surround the two arms of each wire C. The lower ends of the rods H are formed into eyes H², shown in Fig. 2 of the drawings, and a bail-shaped wire N connects said eyes H² and to this bail-shaped member a cord or rope K is fastened. A rod or wire O connects the lower ends of the rods H, as shown clearly in Fig. 2 of the drawings, and serves as a means for holding said rods from being drawn together as the jaws are closed on a downward pull of the cord K. Springs T are mounted upon the pivots upon which the jaws F and F' are journaled and serve to normally throw the jaws open in the position shown in Fig. 1. It will be noted that, when the jaws F are open, their rear edges are in contact with the opposite sides of the shell, as shown in Fig. 3 of the drawings, said sides serving to limit the throw of said jaws.

In operation, by pulling upon the cord K, the jaws which are mounted as shown may be thrown together and cause the fruit to be severed and, as it falls through the shell, will be caught by the bag or trough R and conveyed to any suitable location. Upon releasing the cord, the jaws will spring open as will be readily understood.

What I claim to be new is:—

1. A fruit picker comprising a shell, open at its top and bottom wires secured to the opposite sides of said shell, a handle to which said wires are fastened, jaws pivotally mounted upon said shell, rods fastened to said jaws, guide means upon the shell and wires for said rods, a bail-shaped member connecting the ends of said rods, a wire holding said rods parallel to each other, and a cord secured to said member.

2. A fruit picker comprising a shell with open top and bottom, a bag secured thereto, spring-actuated jaws pivotally mounted upon the opposite sides of said shell, each jaw having integral arms, rods upon the opposite sides of the shell, each rod connected to an arm of each jaw, wires which are bent upon themselves and fastened at their ends to said shell, a handle to which said wires are fastened and between which wires said rods have a longitudinal play, a bail-shaped member connected to said rods, a cord secured to said member, and means for preventing the rods from drawing together as the latter are moved longitudinally by pulling upon said cord.

3. A fruit picker comprising an open ended shell, a bag secured thereto, jaws pivotally mounted upon the opposite sides of the shell, a spring adapted to throw said jaws so that the rear edges thereof will contact with the walls of the shell to limit their movements, wires secured to opposite sides of the shell and spaced apart, a handle secured to said wires, rods connected to said jaws and having a sliding movement intermediate said wires, a bail-shaped member connecting said rods, a cord secured to said member, and means for holding said rods parallel.

In testimony whereof I hereunto affix my signature in the presence of two witnesses.

JOHN ROBERT JOHNSON.

Witnesses:
   CLINTON O'BRIEN,
   LEO MURPHEY.